United States Patent
Li

(10) Patent No.: US 10,126,621 B2
(45) Date of Patent: Nov. 13, 2018

(54) GATE DRIVER ON ARRAY CIRCUIT BASED ON LOW TEMPERATURE POLY-SILICON SEMICONDUCTOR THIN FILM TRANSISTORS

(71) Applicant: WUHAN CHINA STAR OPTOELECTRONICS TECHNOLOGY CO., LTD., Wuhan (CN)

(72) Inventor: Yafeng Li, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 170 days.

(21) Appl. No.: 15/126,418

(22) PCT Filed: Jun. 30, 2016

(86) PCT No.: PCT/CN2016/087799
§ 371 (c)(1),
(2) Date: Sep. 15, 2016

(87) PCT Pub. No.: WO2017/201810
PCT Pub. Date: Nov. 30, 2017

(65) Prior Publication Data
US 2018/0136500 A1 May 17, 2018

(30) Foreign Application Priority Data
May 27, 2016 (CN) .......................... 2016 1 0363726

(51) Int. Cl.
G02F 1/1368 (2006.01)
G09G 3/36 (2006.01)

(52) U.S. Cl.
CPC ............. *G02F 1/1368* (2013.01); *G09G 3/36* (2013.01); *G09G 3/3674* (2013.01)

(58) Field of Classification Search
CPC ...... G11C 19/184; G11C 19/18; G02F 1/1368
(Continued)

(56) References Cited

U.S. PATENT DOCUMENTS 9,201,445 B2* 12/2015 Li .......................... G11C 19/184
9,805,675 B2* 10/2017 Li .......................... G09G 3/3677
(Continued)

FOREIGN PATENT DOCUMENTS

CN 104252853 A 12/2014
CN 104766580 A 7/2015
(Continued)

*Primary Examiner* — Hai L Nguyen
(74) *Attorney, Agent, or Firm* — JMB Davis Ben-David

(57) ABSTRACT

The present disclosure proposes a GOA circuit based on LTPS TFTs. A ninth TFT is introduced to adjust the high and low voltage levels imposed on the second node P(n). The ninth TFT includes a gate and a source both electrically connected to the second node P(n) and a drain electrically connected to a second clock signal. Such designs make it possible that the level of the second node P(n) is pulled down according to a certain frequency when an output terminal G(n) keeps the low voltage level. So the second node P(n) does not need to keep the high voltage level all the time in the present invention. Also, the fourth and the seventh transistors T4 and T7 do not have the problem of a threshold voltage shift due to a long working time.

14 Claims, 4 Drawing Sheets

(58) Field of Classification Search
USPC .......................................... 327/211; 377/64
See application file for complete search history.

(56) References Cited

U.S. PATENT DOCUMENTS

| 9,972,273 | B2* | 5/2018 | Xiao ................. G02F 1/133514 |
|---|---|---|---|
| 2014/0146031 | A1 | 5/2014 | Lee et al. |
| 2016/0314850 | A1 | 10/2016 | Gu et al. |
| 2017/0270879 | A1 | 9/2017 | Han et al. |
| 2017/0270881 | A1 | 9/2017 | Li |

FOREIGN PATENT DOCUMENTS

| CN | 105206243 A | 12/2015 |
|---|---|---|
| CN | 105390086 A | 3/2016 |

* cited by examiner

GATE DRIVER ON ARRAY CIRCUIT BASED ON LOW TEMPERATURE POLY-SILICON SEMICONDUCTOR THIN FILM TRANSISTORS

CROSS-REFERENCE TO RELATED APPLICATIONS

This is the U.S. National Stage of International Patent Application No. PCT/CN2016/087799, filed Jun. 30, 2016, which in turn claims the benefit of China Patent Application No. 201610363726.0, filed May 27, 2016.

BACKGROUND OF THE INVENTION

1. Field of the Invention

The present invention relates to the field of liquid crystal display, and more particularly, to a gate driver on array (GOA) circuit based on low temperature poly-silicon (LTPS) semiconductor thin film transistors (TFT) for improving the stability of the GOA circuit.

2. Description of the Prior Art

The gate driver on array (GOA) technique is that, a gate row scanning driving circuit is fabricated on an array substrate based on a conventional thin film transistor-liquid crystal display (TFT-LCD) to make it come true that the gate is driven by being scanned row by row. The adoption of the GOA technique is good for reducing bonding of external integrated circuit (IC), increasing capacity hopefully, and dropping production costs. Further, it is possible to produce a display equipped a liquid crystal panel with no narrow bezels or no bezels based on the GOA technique.

With the development of low temperature poly-silicon (LTPS) semiconductor TFTs, LTPS-TFT liquid crystal displays (LCDs) are also on the spotlight. LTPS-TFT LCDs have merits of high resolution, quick response, high brightness, high aperture rates, etc. Besides, LTPS semiconductors have extra high carrier mobility so gate drivers are installed on a TFT array substrate based on the GOA technique to achieve system integration (SI), save space, and economize costs of driver integrated circuits (driver ICs). To ensure the stability of an output terminal G(n), Q(n) and P(n) nodes are introduced. The node Q(n) is a node where the output of a gate driving signal is controlled, and the node P(n) is a node where the node Q(n) and the output terminal G(n) keep the stable low voltage level, but most of the time the Q(n) and P(n) nodes are mutually restrained.

Please refer to FIG. 1 showing a schematic diagram of a conventional GOA circuit based on an LTPS semiconductor TFT. The GOA circuit comprises a plurality of a cascade of GOA units. N is set as a positive integer. An nth stage of GOA unit comprises a first TFT T1, a second TFT T2, a third TFT T3, a fourth TFT T4, a fifth TFT T5, a sixth TFT T6, a seventh TFT T7, an eighth TFT T8, a tenth TFT T10, a first capacitor C1, and a second capacitor C2. The first TFT T1 comprises a gate electrically connected to a first clock signal CK1, a source electrically connected to an output terminal G(n−1) of a previous ((n−1)th) stage of the GOA unit, and a gate electrically connected a third node H(n). The second TFT T2 comprises a gate electrically connected to a first node Q(n), a source electrically connected to a second clock signal CK2, and a drain electrically connected to an output terminal G(n). The third TFT T3 comprises a gate electrically connected to a third clock signal CK3, a source electrically connected to an output terminal G(n+1) of a following ((n+1)th) stage of the GOA unit, and a drain electrically connected the third node H(n). The fourth TFT T4 comprises a gate electrically connected to a second node P(n), a source electrically connected to a constant voltage at low voltage level VGL, and a drain electrically connected to the output terminal G(n). The fifth TFT T5 comprises a gate electrically connected to a constant voltage at high voltage level VGH, a source electrically connected to the third node H(n), and a drain electrically connected to the first node Q(n). The sixth TFT T6 comprises a gate electrically connected to the third node H(n), a source electrically connected to the constant voltage at low voltage level VGL, and a drain electrically connected to the second node P(n). The seventh TFT T7 comprises a gate electrically connected to the second node P(n), a source electrically connected to the constant voltage at low voltage level VGL, and a drain electrically connected to the first node Q(n). The eighth TFT T8 comprises a gate and a source both electrically connected to the second clock signal CK2 and a drain electrically connected to the second node P(n). The tenth TFT T10 comprises a gate electrically connected to a fourth clock signal CK4, a source electrically connected to the constant voltage at low voltage level VGL, and a drain electrically connected to the output terminal G(n). One terminal of the first capacitor C1 is electrically connected to the first node Q(n), and the other terminal is electrically connected to the output terminal G(n). One terminal of the second capacitor C2 is electrically connected to the second node P(n), and the other terminal is electrically connected to the constant voltage at low voltage level VGL.

The GOA circuit as shown in FIG. 1 can be scanned forward or backward. The workflow of the forward scanning is similar to that of the backward scanning. Please refer to FIG. 1 and FIG. 2. The GOA circuit is scanned forward here. FIG. 2 shows a timing diagram of a conventional GOA circuit based on the LTPS semiconductor TFT in forward scanning as shown in FIG. 1. The workflow of the GOA circuit based on the LTPS semiconductor TFT in forward scanning is as follows: Stage 1 is to precharge; the output terminal G(n−1) and the first clock signal CK1 both supply the high voltage level; the first TFT T1 is conducted; the gate of the fifth TFT T5 is connected to the constant voltage at high voltage level VGH so the fifth TFT T5 keeps conducted; the third node H(n) is precharged to be at the high voltage level, and the sixth TFT T6 is conducted; the level of the third node H(n) is the same as the level of the first node Q(n); the first node Q(n) is precharged to be at the high voltage level, the second node P(n) is pulled down, and the fourth and seventh TFTs T4, T7 terminate. Stage 2 is to output the high voltage level from the output terminal G(n); the output terminal G(n−1) and the first clock signal CK1 drop to the low voltage level, and the second clock signal CK2 supplies the high voltage level; the first node Q(n) keeps the high voltage level because of the storage function of the first capacitor C1, the second TFT T2 is conducted, the high voltage level of the second clock signal CK2 is output to the output terminal G(n), the output terminal G(n) outputs the high voltage level, and the first node Q(n) is lifted to a higher level. Stage 3 is to output the low voltage level from the output terminal G(n); the third clock signal CK3 and the output terminal G(n+1) both supply the high voltage level, and the first node Q(n) keeps the high voltage level; the second clock signal CK2 drops to the low voltage level, the low voltage level of the second clock signal CK2 is output to the output terminal G(n), and the output terminal G(n) outputs the low voltage level. Stage 4 is to pull the first node Q(n) down to the constant voltage at low voltage level VGL; the first clock signal CK1 supplies the high voltage level again, the output terminal G(n−1) keeps the low voltage level, the first TFT T1 is conducted, the first node Q(n) is pulled down to the constant voltage at low voltage level VGL, and the sixth TFT T6 terminates. Stage 5 is to keep the first node Q(n) and the output terminal G(n) the low voltage level; the second clock signal CK2 jumps to the high voltage level, the eighth TFT T8 is conducted, the second node P(n) is charged to the high voltage level, the fourth and seventh TFTs T4, T7 are conducted to continue to pull down the first node Q(n) and the output terminal G(n) to the constant voltage at low voltage level VGL, respectively; the second node P(n) keeps the high voltage level because of the storage function of the second capacitor C2; the fourth and seventh TFTs T4, T7 keep conducted in a frame of time to keep the first node Q(n) and the output terminal G(n) the low voltage level.

The second node P(n) keeps the high voltage level in the above-mentioned conventional GOA circuit; that is, the fourth and seventh TFTs T4, T7 keep at the conducting state. If the fourth and seventh TFTs T4, T7 operate for a long time, the two key TFTs T4 and T7 will have a problem of a threshold voltage shift, resulting in the decrease in the stability of the circuit and the abnormality of the output of the GOA circuit.

Therefore, an object of the present invention is to propose a new GOA circuit to enhance the stability of the GOA circuit.

SUMMARY OF THE INVENTION

An object of the present invention is to propose a GOA circuit based on an LTPS semiconductor TFT. Compared with the GOA circuit based on the conventional LTPS semiconductor TFT, the second node P(n) will not keep the high voltage level all the time in the present invention. Also, the fourth and the seventh transistors T4 and T7 will not have the problem of a threshold voltage shift due to a long working time. Relatively, the stability of the GOA circuit is enhanced. The display quality of liquid crystal panel is improved as well.

In one aspect of the present invention, a gate driver on array (GOA) circuit based on low temperature poly-silicon (LTPS) semiconductor thin film transistors (TFT) includes a plurality of a cascade of GOA units. Each stage of the plurality of GOA units includes a scan-control module, an output module, a pull-down module, and a node-control module. In an nth stage of GOA unit except a first stage of GOA unit and a last stage of GOA unit where n is a positive integer, the scan-control module includes a first TFT, a third TFT, and a fifth TFT. The first TFT includes a gate electrically connected to a first clock signal, a source electrically connected to an output terminal G(n−1) of an (n−1)th stage of the GOA unit, and a drain electrically connected to a third node. The third TFT includes a gate electrically connected to a third clock signal, a source electrically connected to an output terminal G(n+1) of an (n+1)th stage of the GOA unit, and a drain electrically connected to the third node. The fifth TFT includes a gate electrically connected to a constant voltage at a high voltage level, a source electrically connected to the third node, and a drain electrically connected to a first node. The output module includes a second TFT and a first bootstrap capacitor. The second TFT includes a gate electrically connected to the first node, a source electrically connected to a second clock signal, and a drain electrically connected to an output terminal G(n). The first bootstrap capacitor is electrically connected between the first node and the output terminal G(n). The pull-down module includes a fourth TFT, a sixth TFT, a seventh TFT, an eighth TFT, a tenth TFT, and a second bootstrap capacitor. The fourth TFT includes a gate electrically connected to the second node, a source electrically connected to a constant voltage at low voltage level, and a drain electrically connected to the output terminal G(n). The sixth TFT includes a gate electrically connected to the third node, a source electrically connected to the constant voltage at low voltage level, and a drain electrically connected to the second node. The seventh TFT includes a gate electrically connected to the second node, a source electrically connected to the constant voltage at low voltage level, and a drain electrically connected to the first node. The eighth TFT includes a gate and a source both electrically connected to the second clock signal and a drain electrically connected to the second node. The tenth TFT includes a gate electrically connected to the fourth clock signal, a source electrically connected to the constant voltage at low voltage level, and a drain electrically connected to the output terminal G(n). The second bootstrap capacitor is electrically connected between the second node and the constant voltage at low voltage level. The node-control module, electrically connected to the second clock signal and the second node, is configured to control the second node to switch between the high voltage level and the low voltage level according to the second clock signal. Pulses of the first clock signal, the second clock signal, the third clock signal, and the fourth clock signal are output sequentially in turns and never overlap. In forward scanning, the first clock signal electrically connected to the first TFT and the output terminal G(n−1) supply the high voltage level at the same time. In backward scanning, the third clock signal electrically connected to the third TFT and the output terminal G(n+1) supply the high voltage level at the same time.

In another aspect of the present invention, a gate driver on array (GOA) circuit based on low temperature poly-silicon (LTPS) semiconductor thin film transistors (TFT) includes a plurality of a cascade of GOA units. Each stage of the plurality of GOA units includes a scan-control module, an output module, a pull-down module, and a node-control module. In an nth stage of GOA unit except a first stage of GOA unit and a last stage of GOA unit where n is a positive integer, the scan-control module includes a first TFT, a third TFT, and a fifth TFT. The first TFT includes a gate electrically connected to a first clock signal, a source electrically connected to an output terminal G(n−1) of an (n−1)th stage of the GOA unit, and a drain electrically connected to a third node. The third TFT includes a gate electrically connected to a third clock signal, a source electrically connected to an output terminal G(n+1) of an (n+1)th stage of the GOA unit, and a drain electrically connected to the third node. The fifth TFT includes a gate electrically connected to a constant voltage at a high voltage level, a source electrically connected to the third node, and a drain electrically connected to a first node. The output module includes a second TFT and a first bootstrap capacitor. The second TFT includes a gate electrically connected to the first node, a source electrically connected to a second clock signal, and a drain electrically connected to an output terminal G(n). The first bootstrap capacitor is electrically connected between the first node and the output terminal G(n). The pull-down module includes a fourth TFT, a sixth TFT, a seventh TFT, an eighth TFT, a tenth TFT, and a second bootstrap capacitor. The fourth TFT includes a gate electrically connected to the second node, a source electrically connected to a constant voltage at low voltage level, and a drain electrically connected to the output terminal G(n). The sixth TFT includes a gate electrically connected to the third node, a source electrically connected to the constant voltage at low voltage level, and a drain electrically connected to the second node. The seventh TFT includes a gate electrically connected to the second node, a source electrically connected to the constant voltage at low voltage level, and a drain electrically connected to the first node. The eighth TFT includes a gate and a source both electrically connected to the second clock signal and a drain electrically connected to the second node. The tenth TFT includes a gate electrically connected to the fourth clock signal, a source electrically connected to the constant voltage at low voltage level, and a drain electrically connected to the output terminal G(n). The second bootstrap capacitor is electrically connected between the second node and the constant voltage at low voltage level. The node-control module, electrically connected to the second clock signal and the second node, is configured to control the second node to switch between the high voltage level and the low voltage level according to the second clock signal.

In the present invention, the ninth TFT is introduced to adjust the high and low voltage levels imposed on the second node P(n). The ninth TFT comprises a gate and a source both electrically connected to the second node P(n) and a drain electrically connected to a second clock signal. Otherwise, the ninth TFT comprises a gate electrically connected to a fourth clock signal, a source electrically connected to the second node P(n), and a drain electrically connected to a second clock signal. Such designs make it possible that the level of the second node P(n) is pulled down according to a certain frequency when an output terminal G(n) keeps the low voltage level. So the second node P(n) does not need to keep the high voltage level all the time in the present invention. Also, the fourth and the seventh transistors T4 and T7 do not have the problem of a threshold voltage shift due to a long working time. Relatively, the stability of the GOA circuit is enhanced to be perfectly applied to the design of liquid crystal panels with high resolutions. The GOA circuit proposed by the present invention can be applied to drive cellphones, displays, or televisions. The above-mentioned is just the advantage of the present invention.

DETAILED DESCRIPTION OF THE PREFERRED EMBODIMENTS

These and other objectives of the claimed invention will no doubt become obvious to those of ordinary skill in the art after reading the following detailed description of the preferred embodiment that is illustrated in the various figures and drawings.

Figure 1:
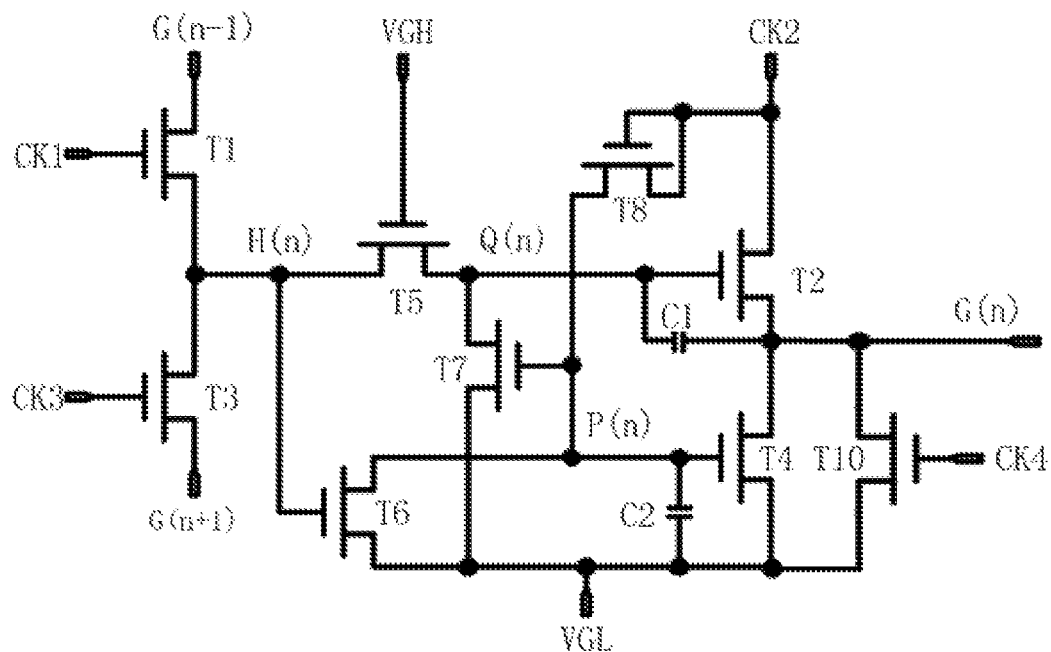
FIG. 1 shows a schematic diagram of a conventional GOA circuit based on an LTPS semiconductor TFT.
Figure 2:
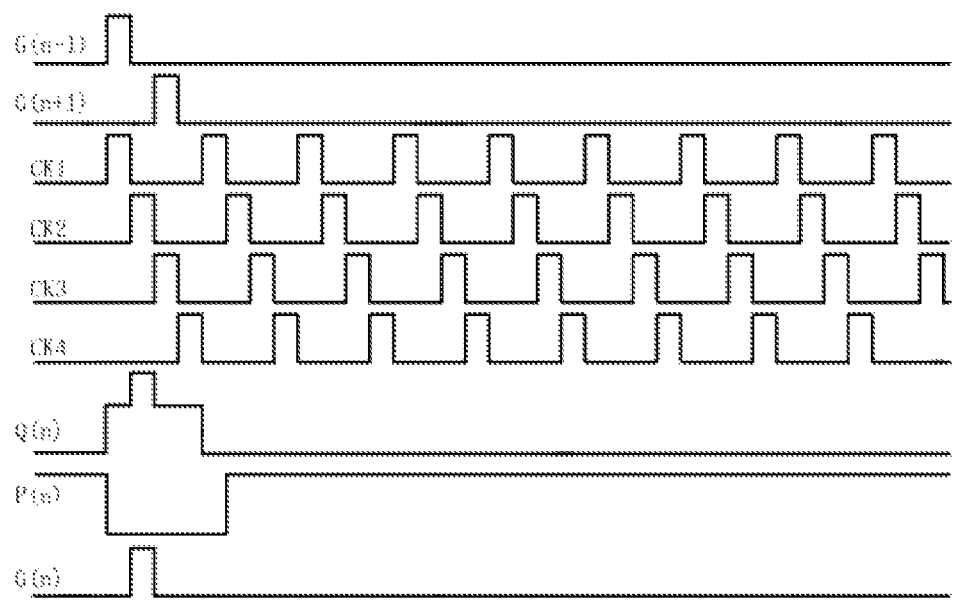
FIG. 2 shows a timing diagram of a conventional GOA circuit based on the LTPS semiconductor TFT in forward scanning as shown in FIG. 1.
Figure 3:
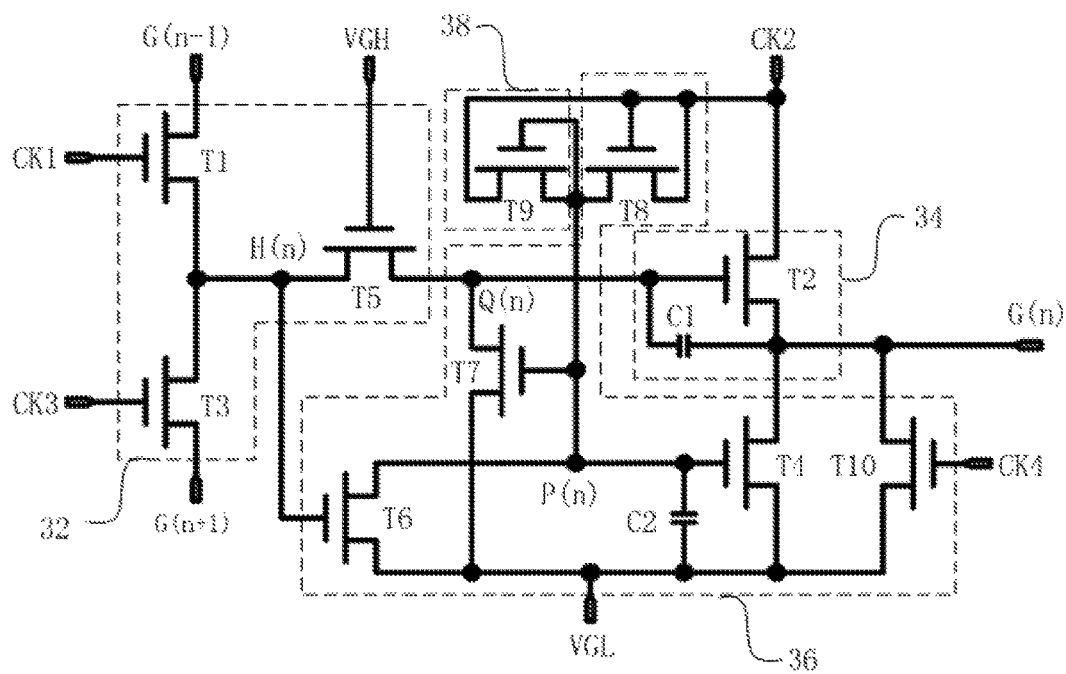
FIG. 3 shows a schematic diagram of a gate driver on array (GOA) circuit based on a low temperature poly-silicon (LTPS) semiconductor thin-film transistor (TFT) according to one preferred embodiment of the present invention.

Please refer to FIG. 3 showing a schematic diagram of a gate driver on array (GOA) circuit based on a low temperature poly-silicon (LTPS) semiconductor thin-film transistor (TFT) according to one preferred embodiment of the present invention. The GOA circuit comprises: a plurality of a cascade of GOA units. Each stage of the plurality of GOA units comprises a scan-control module 32, an output module 34, a pull-down module 36, and a node-control module 38.

In the nth stage of GOA unit except a first stage of GOA unit and a last stage of GOA unit, the scan-control module 32 comprises a first TFT T1, a third TFT T3, and a fifth TFT T5; the output module 34 comprises a second TFT T2 and a first bootstrap capacitor C1; the pull-down module 36 comprises a fourth TFT T4, a sixth TFT T6, a seventh TFT T7, an eighth TFT T8, a tenth TFT T10, and a second bootstrap capacitor C2. N is set as a positive integer.

In the scan-control module 32, the first TFT T1 comprises a gate electrically connected to a first clock signal CK1, a source electrically connected to an output terminal G(n−1) of a previous (n−1)th stage of the GOA units, and a drain electrically connected to a third node H(n). The third TFT T3 comprises a gate electrically connected to a third clock signal CK3, a source electrically connected to an output terminal G(n+1) of a following (n+1)th stage of the GOA units, and a drain electrically connected to the third node H(n). The fifth TFT T5 comprises a gate electrically connected to a constant voltage at high voltage level VGH, a source electrically connected to the third node H(n), and a drain electrically connected to a first node Q(n).

In the output module 34, the second TFT T2 comprises a gate electrically connected to the first node Q(n), a source electrically connected to a second clock signal CK2, and a drain electrically connected to an output terminal G(n). One terminal of the first bootstrap capacitor C1 is electrically connected to the first node Q(n), and the other terminal is electrically connected to the output terminal G(n).

In the pull-down module 36, the fourth TFT T4 comprises a gate electrically connected to the second node P(n), a source electrically connected to a constant voltage at low voltage level VGL, and a drain electrically connected to the output terminal G(n). The sixth TFT T6 comprises a gate electrically connected to the third node H(n), a source electrically connected to the constant voltage at low voltage level VGL, and a drain electrically connected to the second node P(n). The seventh TFT T7 comprises a gate electrically connected to the second node P(n), a source electrically connected to the constant voltage at low voltage level VGL, and a drain electrically connected to the first node Q(n). The eighth TFT T8 comprises a gate and a source both electrically connected to the second clock signal CK2 and a drain electrically connected to the second node P(n). The tenth TFT T10 comprises a gate electrically connected to the fourth clock signal CK4, a source electrically connected to the constant voltage at low voltage level VGL, and a drain electrically connected to the output terminal G(n). One terminal of the second bootstrap capacitor C2 is electrically connected to the second node P(n), and the other terminal is electrically connected to the constant voltage at low voltage level VGL.

The node-control module 38 is electrically connected to the second clock signal CK2 and the second node P(n). The node-control module 38 is used to control the second node P(n) to switch between a high voltage level and a low voltage level according to the second clock signal CK2.

In this embodiment, the node-control module 38 comprises a ninth TFT T9. The TFT T9 comprises a gate and a source both electrically connected to the second node P(n) and a drain electrically connected to the second clock signal CK2. When the output terminal G(n) keeps the low voltage level, the level of the second node P(n) jumps to the high voltage level according to the second clock signal CK2, which is the same high voltage level jump, and drops to the low voltage level according to the second clock signal CK2 to be at the low voltage level.

Each of the TFTs adopted in the present invention is an LTPS semiconductor TFT.

The GOA circuit comprises the four clock signals, that is, the first clock signal CK1, the second clock signal CK2, the third clock signal CK3, and the fourth clock signal CK4. The pulses of the four clock signals are output sequentially in turns and never overlap.

In the first stage of the GOA unit, the source of the first TFT T1 is electrically connected to a circuit onset signal STY. In the last stage of the GOA unit, the source of the third TFT T3 is electrically connected to the circuit onset signal STY. The GOA circuit based on the LTPS semiconductor TFT proposed by this present invention can be scanned from the first stage to the last stage one by one in forward scanning or from the last stage to the first scanning one by one in backward scanning. In forward scanning, the first TFT T1 is supplied with a first clock signal (i.e., the first clock CK1 at the high voltage level) and the circuit onset signal STV at first. In other words, the first clock CK1 electrically connected to the first TFT T1 and the output terminal G(n−1) of the previous stage of the GOA circuit (the (n−1)th stage) supplies the high voltage level at the same time in forward scanning. In backward scanning, the third TFT T3 is supplied with a first clock signal (i.e., the third clock CK3 at the high voltage level) and the circuit onset signal STV at first. In other words, the third clock CK3 electrically connected to the third TFT T3 and the output terminal G(n+1) of the following stage of the GOA circuit (the (n+1)th stage) supplies the high voltage level at the same time in backward scanning.

In the GOA circuit based on the LTPS semiconductor TFT, the level of the second node P(n) is pulled down according to a certain frequency in either forward scanning or backward scanning.

Figure 4:
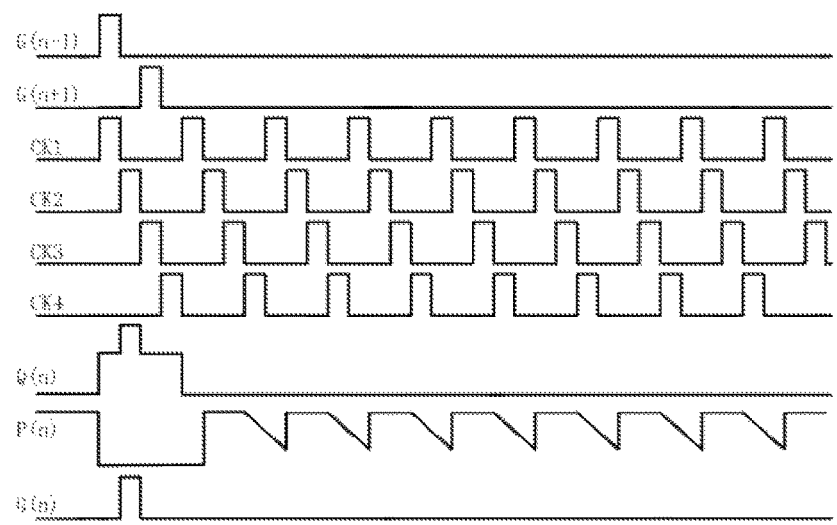
FIG. 4 shows a timing diagram of the GOA circuit based on the LTPS semiconductor TFT in forward scanning as shown in FIG. 3.

Please refer to FIG. 4 showing a timing diagram of the GOA circuit based on the LTPS semiconductor TFT in forward scanning as shown in FIG. 3. The workflow of the GOA circuit based on the LTPS semiconductor TFT in forward scanning is as follows:

Stage 1: The first clock signal CK1 and the output terminal G(n−1) both supply the high voltage level. The second, third, and fourth clock signals CK2, CK3, CK4 all supply the low voltage level. The output terminal G(n+1) also supplies the low voltage level. The first TFT T1 is conducted by the first clock signal CK1. The third node H(n) is precharged to the high voltage level. The sixth TFT T6 is conducted by the third node H(n). The fifth TFT T5 keeps conducted all the time under the control of the constant voltage at high voltage level VGH so the third node H(n) and the first node Q(n) have the same level at all times. The first node Q(n) is precharged to the high voltage level. The second node P(n) is pulled down to the constant voltage at low voltage level VGL. At last, the fourth and seventh TFTs T4, T7 controlled by the second node P(n) terminate.

Stage 2: The first clock signal CK1 and the output terminal G(n−1) both drop to the low voltage level. The second clock signal CK2 supplies the high voltage level. The third and fourth clock signals CK3, CK4 and the output terminal G(n+1) still supply the low voltage level. The first node Q(n) keeps the high voltage level because of storage of the first bootstrap capacitor C1. The second TFT T2 is conducted. The high voltage level of the second clock signal CK2 is output to the output terminal G(n), and then the output terminal G(n) outputs the high voltage level, and finally the first node Q(n) is lifted to a higher level. The sixth TFT T6 still keeps conducted. The second node P(n) keeps the constant voltage at low voltage level VGL. At last, the fourth and seventh TFTs T4, T7 controlled by the second node P(n) still terminate.

Stage 3: The second clock signal CK2 drops to the low voltage level. The third clock signal CK3 and the output terminal G(n+1) both supply the high voltage level. The first and fourth clock signals CK1, CK4 and the output terminal G(n−1) still supply the low voltage level. The third TFT T3 controlled by the third clock signal CK3 is conducted. The first node Q(n) keeps the high voltage level. The second and sixth TFTs T2, T6 are still conducted. The second node P(n) still keeps the constant voltage at low voltage level VGL. The fourth and seventh TFTs T4, T7 controlled by the second node P(n) still terminate. Because the second TFT T2 is still conducted, the low voltage level of the second clock signal CK2 is output to the output terminal G(n), and then the output terminal G(n) outputs the low voltage level.

Stage 4: The first clock signal CK1 supplies the high voltage level again. The second, third, and fourth clock signals CK2, CK3, CK4, and the output terminal G(n−1) supply the low voltage level. The first TFT T1 is conducted by the first clock signal CK1. The first node Q(n) is pulled down to the constant voltage at low voltage level VGL. At last, the second and sixth TFTs T2, T6 terminate.

Stage 5: The first clock signal CK1 drops to the low voltage level. The second clock signal CK2 supplies the high voltage level. The third and fourth clock signals CK3, CK4 and the output terminals G(n−1), G(n+1) supply the low voltage level. The eighth TFT T8 is conducted. The second node P(n) is charged to the high voltage level. The fourth and seventh TFTs T4, T7 are conducted, so the first node Q(n) and the output terminal G(n) keep the low voltage level. The second node P(n) keeps the high voltage level because of storage of the second bootstrap capacitor C2. When the second clock signal CK2 drops to the low voltage level from the high voltage level, the second node P(n) is at the high voltage level, and the ninth TFT T9 is conducted. Meanwhile, the second node P(n) is pulled down somewhat because of the low voltage level of the second clock signal CK2. Because of storage of the second bootstrap capacitor C2, the second node P(n) drops to the low voltage level linearly after a period of delay time when clock signal CK2 drops to the low voltage level. That is, when the output terminals G(n) keeps the low voltage level, the level of the second node P(n) jumps to the high voltage level according to the second clock signal CK2, which is the same high voltage level jump, and drops to the low voltage level according to the second clock signal CK2 to be at the low voltage level.

Compared with the conventional technology where the second node P(n) keeps the high voltage level all the time and the fourth and seventh TFTs T4, T7 are conducted in a frame of time, the second node P(n) in the GOA circuit based on the LTPS semiconductor TFT proposed by the present invention in Stage 5 is pulled down according to a certain frequency. The second node P(n) does not need to keep the high voltage level all the time. In this way, the problem of a threshold voltage shift does not occur successfully in the fourth and seventh TFTs T4, T7 in long-time operations. In addition, the stability of the GOA circuit is effectively enhanced.

Figure 5:
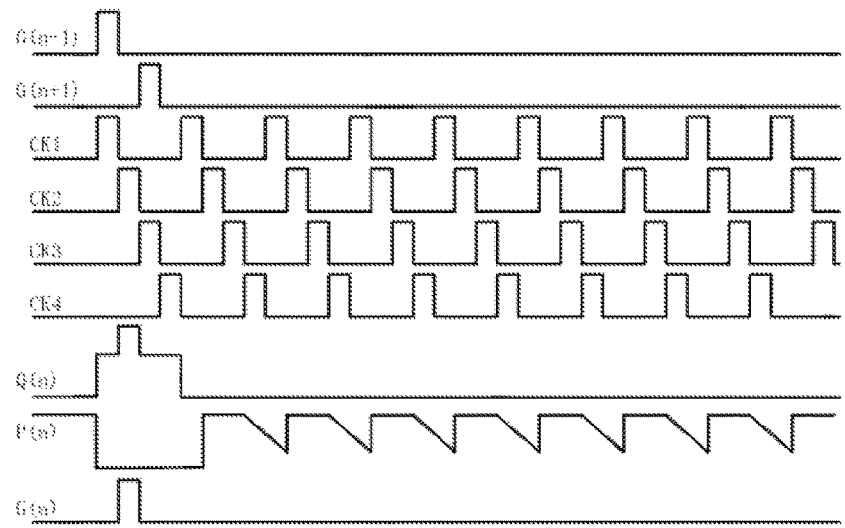
FIG. 5 shows a timing diagram of the GOA circuit based on the LTPS semiconductor TFT in backward scanning as shown in FIG. 3.

Please refer to FIG. 5 showing a timing diagram of the GOA circuit based on the LTPS semiconductor TFT in backward scanning as shown in FIG. 3. The workflow of the forward scanning is similar to that of the backward scanning. The workflow of the GOA circuit based on the LTPS semiconductor TFT in backward scanning is outlined as follows:

Stage 1: The third clock signal CK3 and the output terminal G(n+1) both supply the high voltage level. The third TFT T3 is conducted by the third clock signal CK3. The third node H(n) is pre-charged to the high voltage level. The sixth TFT T6 is conducted by the third node H(n). The fifth TFT T5 keeps conducted all the time under the control of the constant voltage at high voltage level VGH so the third node H(n) and the first node Q(n) have the same level at all times. The first node Q(n) is pre-charged to the high voltage level. The second node P(n) is pulled down to the constant voltage at low voltage level VGL. At last, the fourth and seventh TFTs T4, T7 terminate.

Stage 2: The second clock signal CK2 supplies the high voltage level. The first node Q(n) keeps the high voltage level because of storage of the first bootstrap capacitor C1. The second TFT T2 is conducted. The high voltage level of the second clock signal CK2 is output to the output terminal G(n), and then the output terminal G(n) outputs the high voltage level, and finally the first node Q(n) is lifted to a higher level.

Stage 3: The second clock signal CK2 drops to the low voltage level. The first clock signal CK1 and the output terminal G(n−1) both supply a high voltage level. The first node Q(n) still at the high voltage level. The second TFT T2 is still conducted. The low voltage level of the second clock signal CK2 is output to the output terminal G(n), and then the output terminal G(n) outputs the low voltage level.

Stage 4: The third clock signal CK3 supplies the high voltage level again. The output terminal G(n+1) supplies the low voltage level. The third TFT T3 is conducted. The first node Q(n) is pulled down to the constant voltage at low voltage level VGL.

Stage 5: The third clock signal CK3 drops to the low voltage level. The second clock signal CK2 supplies the high voltage level. The eighth TFT T8 is conducted. The second node P(n) is charged to the high voltage level. The fourth and seventh TFTs T4, T7 are conducted, so the first node Q(n) and the output terminal G(n) keep the low voltage level. The second node P(n) keeps the high voltage level because of storage of the second bootstrap capacitor C2. When the second clock signal CK2 drops to the low voltage level from the high voltage level, the second node P(n) is at the high voltage level, and the ninth TFT T9 is conducted. Meanwhile, the second node P(n) is pulled down somewhat because of the low voltage level of the second clock signal CK2. Because of storage of the second bootstrap capacitor C2, the second node P(n) drops to the low voltage level linearly after a period of delay time when clock signal CK2 drops to the low voltage level. That is, when the output terminals G(n) keeps the low voltage level, the level of the second node P(n) jumps to the high voltage level according to the second clock signal CK2, which is the same high voltage level jump, and drops to the low voltage level according to the second clock signal CK2

Compared with the conventional technology where the second node P(n) keeps the high voltage level all the time and the fourth and seventh TFTs T4, T7 are conducted in a frame of time, the second node P(n) in the GOA circuit based on the LTPS semiconductor TFT proposed by the present invention in Stage 5 is pulled down according to a certain frequency. The second node P(n) does not need to keep the high voltage level all the time. In this way, the problem of a threshold voltage shift does not occur successfully in the fourth and seventh TFTs T4, T7 in long-time operations. In addition, the stability of the GOA circuit is effectively enhanced.

Figure 6:
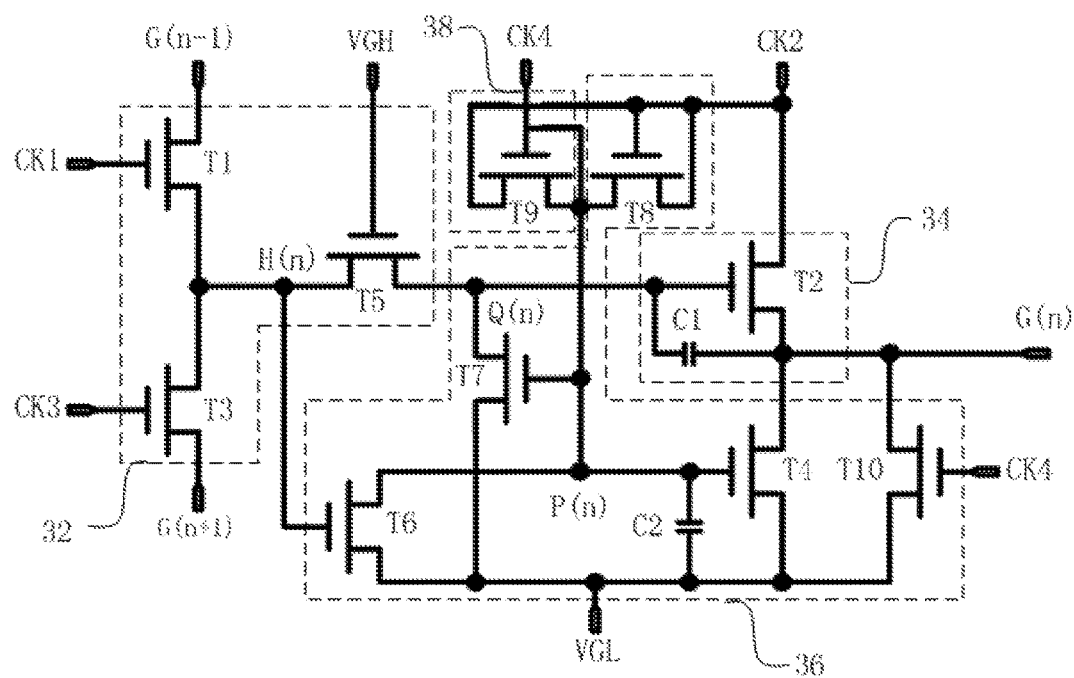
FIG. 6 showing a schematic diagram of a gate driver on array (GOA) circuit based on a low temperature poly-silicon (LTPS) semiconductor thin-film transistor (TFT) according to another one preferred embodiment of the present invention.

Please refer to FIG. 6 showing a schematic diagram of a gate driver on array (GOA) circuit based on a low temperature poly-silicon (LTPS) semiconductor thin-film transistor (TFT) according to another one preferred embodiment of the present invention. The difference between the embodiment as shown in FIG. 3 and this embodiment as shown in FIG. 6 is that a ninth TFT T9 comprises a gate electrically connected to a fourth clock signal CK4, a source electrically connected to a second node P(n), and a drain electrically connected to a second clock signal CK2 in a node-control module 38 proposed by this embodiment. When an output terminal G(n) keeps the low voltage level, the level of the second node P(n) jumps to the high voltage level according to the second clock signal CK2, which is the same high voltage level jump, and drops to the low voltage level according to a fourth clock signal CK4, which is a low voltage level drop.

Figure 7:
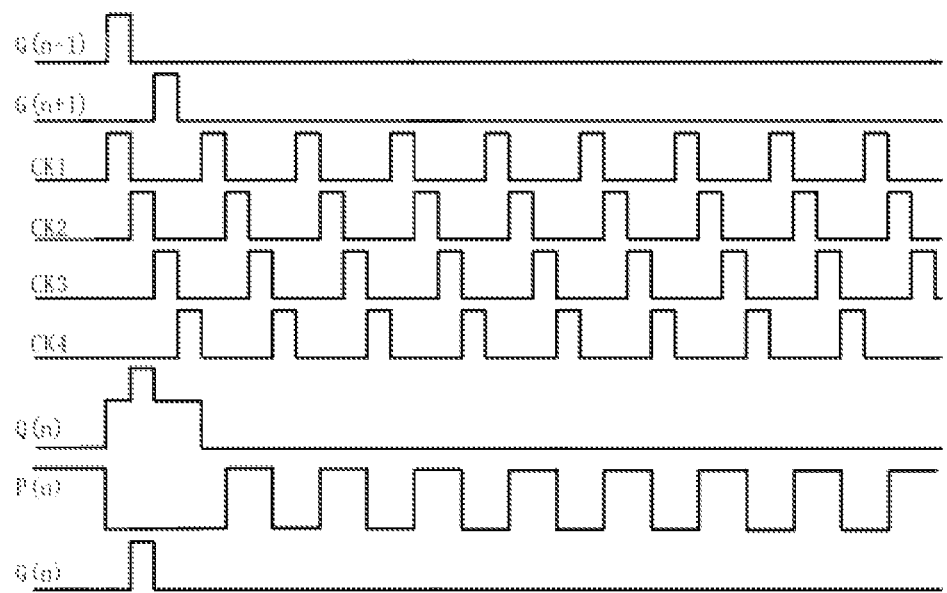
FIG. 7 shows a timing diagram of the GOA circuit based on the LTPS semiconductor TFT in forward scanning as shown in FIG. 6.

FIG. 7 shows a timing diagram of the GOA circuit based on the LTPS semiconductor TFT in forward scanning as shown in FIG. 6. The difference between FIG. 7 and FIG. 4 is that when the output terminal G(n) keeps the low voltage level, the level of the second node P(n) drops to the low voltage level in response to a jump of the clock signal CK4 from the low voltage level to the high voltage level. The person skilled in the art can understand the differences of sequence according to the connection of the ninth TFT T9 in the GOA circuit shown in FIG. 3 and FIG. 6. Details will not be disclosed further.

Figure 8:
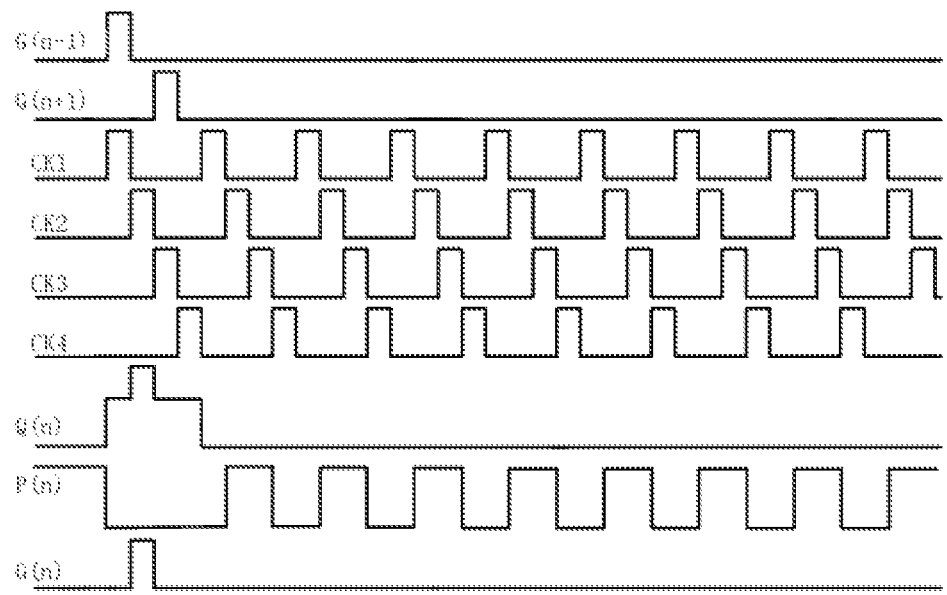
FIG. 8 shows a timing diagram of the GOA circuit based on the LTPS semiconductor TFT in backward scanning as shown in FIG. 6.

FIG. 8 shows a timing diagram of the GOA circuit based on the LTPS semiconductor TFT in backward scanning as shown in FIG. 6. The difference between FIG. 8 and FIG. 5 is that when the output terminal G(n) keeps the low voltage level, the level of the second node P(n) drops to the low voltage level in response to a jump of the clock signal CK4 from the low voltage level to the high voltage level. The person skilled in the art can understand the differences of sequence according to the connection of the ninth TFT T9 in the GOA circuit shown in FIG. 3 and FIG. 6. Details will not be disclosed further.

To sum up, the present disclosure proposes a GOA circuit based on LTPS TFTs. The ninth TFT is introduced to adjust the high and low voltage levels imposed on the second node P(n). The ninth TFT comprises a gate and a source both electrically connected to the second node P(n) and a drain electrically connected to a second clock signal. Otherwise, the ninth TFT comprises a gate electrically connected to a fourth clock signal, a source electrically connected to the second node P(n), and a drain electrically connected to a second clock signal. Such designs make it possible that the level of the second node P(n) is pulled down according to a certain frequency when an output terminal G(n) keeps the low voltage level. So the second node P(n) does not need to keep the high voltage level all the time in the present invention. Also, the fourth and the seventh transistors T4 and T7 do not have the problem of a threshold voltage shift due to a long working time. Relatively, the stability of the GOA circuit is enhanced to be perfectly applied to the design of liquid crystal panels with high resolutions. The GOA circuit proposed by the present invention can be applied to drive cellphones, displays, or televisions. The above-mentioned is just the advantage of the present invention.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A gate driver on array (GOA) circuit based on low temperature poly-silicon (LTPS) semiconductor thin film transistors (TFT), comprising: a plurality of a cascade of GOA units, and each stage of the plurality of GOA units comprising a scan-control module, an output module, a pull-down module, and a node-control module;

in an nth stage of GOA unit except a first stage of GOA unit and a last stage of GOA unit where n is a positive integer, the scan-control module comprising:
  a first TFT, comprising a gate electrically connected to a first clock signal, a source electrically connected to an output terminal G(n−1) of an (n−1)th stage of the GOA unit, and a drain electrically connected to a third node;
  a third TFT, comprising a gate electrically connected to a third clock signal, a source electrically connected to an output terminal G(n+1) of an (n+1)th stage of the GOA unit, and a drain electrically connected to the third node; and
  a fifth TFT, comprising a gate electrically connected to a constant voltage at a high voltage level, a source electrically connected to the third node, and a drain electrically connected to a first node;
the output module comprising:
  a second TFT, comprising a gate electrically connected to the first node, a source electrically connected to a second clock signal, and a drain electrically connected to an output terminal G(n); and
  a first bootstrap capacitor, electrically connected between the first node and the output terminal G(n);
the pull-down module, comprising:
  a fourth TFT, comprising a gate electrically connected to the second node, a source electrically connected to a constant voltage at low voltage level, and a drain electrically connected to the output terminal G(n);
  a sixth TFT, comprising a gate electrically connected to the third node, a source electrically connected to the constant voltage at low voltage level, and a drain electrically connected to the second node;
  a seventh TFT, comprising a gate electrically connected to the second node, a source electrically connected to the constant voltage at low voltage level, and a drain electrically connected to the first node;
  an eighth TFT, comprising a gate and a source both electrically connected to the second clock signal and a drain electrically connected to the second node;
  a tenth TFT, comprising a gate electrically connected to the fourth clock signal, a source electrically connected to the constant voltage at low voltage level, and a drain electrically connected to the output terminal G(n); and
  a second bootstrap capacitor, electrically connected between the second node and the constant voltage at low voltage level; and
the node-control module, electrically connected to the second clock signal and the second node, configured to control the second node to switch between the high voltage level and the low voltage level according to the second clock signal;
wherein pulses of the first clock signal, the second clock signal, the third clock signal, and the fourth clock signal are output sequentially in turns and never overlap; in forward scanning, the first clock signal electrically connected to the first TFT and the output terminal G(n−1) supply the high voltage level at the same time; in backward scanning, the third clock signal electrically connected to the third TFT and the output terminal G(n+1) supply the high voltage level at the same time.

2. The GOA circuit of claim 1, wherein the node-control module comprises a ninth TFT, and the ninth TFT comprises a gate and a source both electrically connected to the second node, and a drain electrically connected to the second clock signal.

3. The GOA circuit of claim 2, wherein when the output terminal G(n) keeps the low voltage level, the level of the second node jumps to the high voltage level in response to a jump of the second clock signal from the low voltage level to the high voltage level, and the level of the second node drops to the low voltage level in response to a drop of the second clock signal from the high voltage level to the low voltage level.

4. The GOA circuit of claim 1, wherein the node-control module comprises a ninth TFT, and the ninth TFT T9 comprises a gate electrically connected to a fourth clock signal, a source electrically connected to the second node, and a drain electrically connected to the second clock signal.

5. The GOA circuit of claim 4, wherein when the output terminals G(n) keeps the low voltage level, the level of the second node jumps to the high voltage level in response to a jump of the second clock signal from the low voltage level to the high voltage level, and the level of the second node drops to the low voltage level in response to a jump of the fourth clock signal from the low voltage level to the high voltage level.

6. The GOA circuit of claim 1, wherein all of the TFTs are LTPS semiconductor TFTs.

7. A gate driver on array (GOA) circuit based on low temperature poly-silicon (LTPS) semiconductor thin film transistors (TFT), comprising: a plurality of a cascade of GOA units, and each stage of the plurality of GOA units comprising a scan-control module, an output module, a pull-down module, and a node-control module;

in an nth stage of GOA unit except a first stage of GOA unit and a last stage of GOA unit where n is a positive integer, the scan-control module comprising:
  a first TFT, comprising a gate electrically connected to a first clock signal, a source electrically connected to an output terminal G(n−1) of an (n−1)th stage of the GOA unit, and a drain electrically connected to a third node;
  a third TFT, comprising a gate electrically connected to a third clock signal, a source electrically connected to an output terminal G(n+1) of an (n+1)th stage of the GOA unit, and a drain electrically connected to the third node; and a fifth TFT, comprising a gate electrically connected to a constant voltage at a high voltage level, a source electrically connected to the third node, and a drain electrically connected to a first node;

the output module comprising:

a second TFT, comprising a gate electrically connected to the first node, a source electrically connected to a second clock signal, and a drain electrically connected to an output terminal G(n); and a first bootstrap capacitor, electrically connected between the first node and the output terminal G(n);

the pull-down module, comprising:

a fourth TFT, comprising a gate electrically connected to the second node, a source electrically connected to a constant voltage at low voltage level, and a drain electrically connected to the output terminal G(n);

a sixth TFT, comprising a gate electrically connected to the third node, a source electrically connected to the constant voltage at low voltage level, and a drain electrically connected to the second node;

a seventh TFT, comprising a gate electrically connected to the second node, a source electrically connected to the constant voltage at low voltage level, and a drain electrically connected to the first node;

an eighth TFT, comprising a gate and a source both electrically connected to the second clock signal and a drain electrically connected to the second node;

a tenth TFT, comprising a gate electrically connected to the fourth clock signal, a source electrically connected to the constant voltage at low voltage level, and a drain electrically connected to the output terminal G(n); and a second bootstrap capacitor, electrically connected between the second node and the constant voltage at low voltage level; and the node-control module, electrically connected to the second clock signal and the second node, configured to control the second node to switch between the high voltage level and the low voltage level according to the second clock signal.

8. The GOA circuit of claim 7, wherein the node-control module comprises a ninth TFT, and the ninth TFT comprises a gate and a source both electrically connected to the second node, and a drain electrically connected to the second clock signal.

9. The GOA circuit of claim 8, wherein when the output terminal G(n) keeps the low voltage level, the level of the second node jumps to the high voltage level in response to a jump of the second clock signal from the low voltage level to the high voltage level, and the level of the second node drops to the low voltage level in response to a drop of the second clock signal from the high voltage level to the low voltage level.

10. The GOA circuit of claim 7, wherein the node-control module comprises a ninth TFT, and the ninth TFT T9 comprises a gate electrically connected to a fourth clock signal, a source electrically connected to the second node, and a drain electrically connected to the second clock signal.

11. The GOA circuit of claim 10, wherein when the output terminals G(n) keeps the low voltage level, the level of the second node jumps to the high voltage level in response to a jump of the second clock signal from the low voltage level to the high voltage level, and the level of the second node drops to the low voltage level in response to a jump of the fourth clock signal from the low voltage level to the high voltage level.

12. The GOA circuit of claim 7, wherein pulses of the first clock signal, the second clock signal, the third clock signal, and the fourth clock signal are output sequentially in turns and never overlap.

13. The GOA circuit of claim 7, wherein in forward scanning, the first clock signal electrically connected to the first TFT and the output terminal G(n−1) supply the high voltage level at the same time; in backward scanning, the third clock signal electrically connected to the third TFT and the output terminal G(n+1) supply the high voltage level at the same time.

14. The GOA circuit of claim 7, wherein all of the TFTs are LTPS semiconductor TFTs.

* * * * *